United States Patent [19]
Ohtake

[11] Patent Number: 5,479,295
[45] Date of Patent: Dec. 26, 1995

[54] COMPACT ZOOM LENS

[75] Inventor: Motoyuki Ohtake, Ohmiya, Japan

[73] Assignee: Nikon Corporation, Tokyo, Japan

[21] Appl. No.: 299,409

[22] Filed: Sep. 1, 1994

[30] Foreign Application Priority Data

Sep. 2, 1993 [JP] Japan ................................ 5-242043

[51] Int. Cl.$^6$ ........................................... G02B 15/14
[52] U.S. Cl. .................................... 359/692; 359/714
[58] Field of Search .................................. 359/708, 713, 359/714, 692

[56] References Cited

U.S. PATENT DOCUMENTS

| | | | |
|---|---|---|---|
| 4,929,069 | 5/1990 | Shibayama | 359/692 |
| 5,227,920 | 7/1993 | Shibayama | 359/692 |
| 5,353,163 | 10/1994 | Shibayama et al. | 359/692 |

FOREIGN PATENT DOCUMENTS

| | | |
|---|---|---|
| 2-73322 | 3/1990 | Japan . |
| 4-225309 | 8/1992 | Japan . |
| 5-127082 | 5/1993 | Japan . |

Primary Examiner—Scott J. Sugarman
Attorney, Agent, or Firm—Shapiro and Shapiro

[57] ABSTRACT

A variable focal length optical system comprises, in the following order from the object side, a first lens group having positive refractive power, the first lens group including, in succession from the object side, a first lens component having positive refractive power, a second lens component comprising a cemented lens consisting of a negative lens component and a positive lens component, and a third lens component having positive refractive power, and a second lens group having negative refractive power, the second lens group including, in succession from the object side, a fourth lens component having positive refractive power, and a fifth lens component having negative refractive power. The variable focal length optical system satisfies the following condition:

$$-0.19 < (r23-r32)/(r23+r32) < -0.01,$$

where r23 is the radius of curvature of that surface of the second lens component which is most adjacent to the image side, and r32 is the radius of curvature of that surface of the third lens component which is most adjacent to the image side.

7 Claims, 1 Drawing Sheet

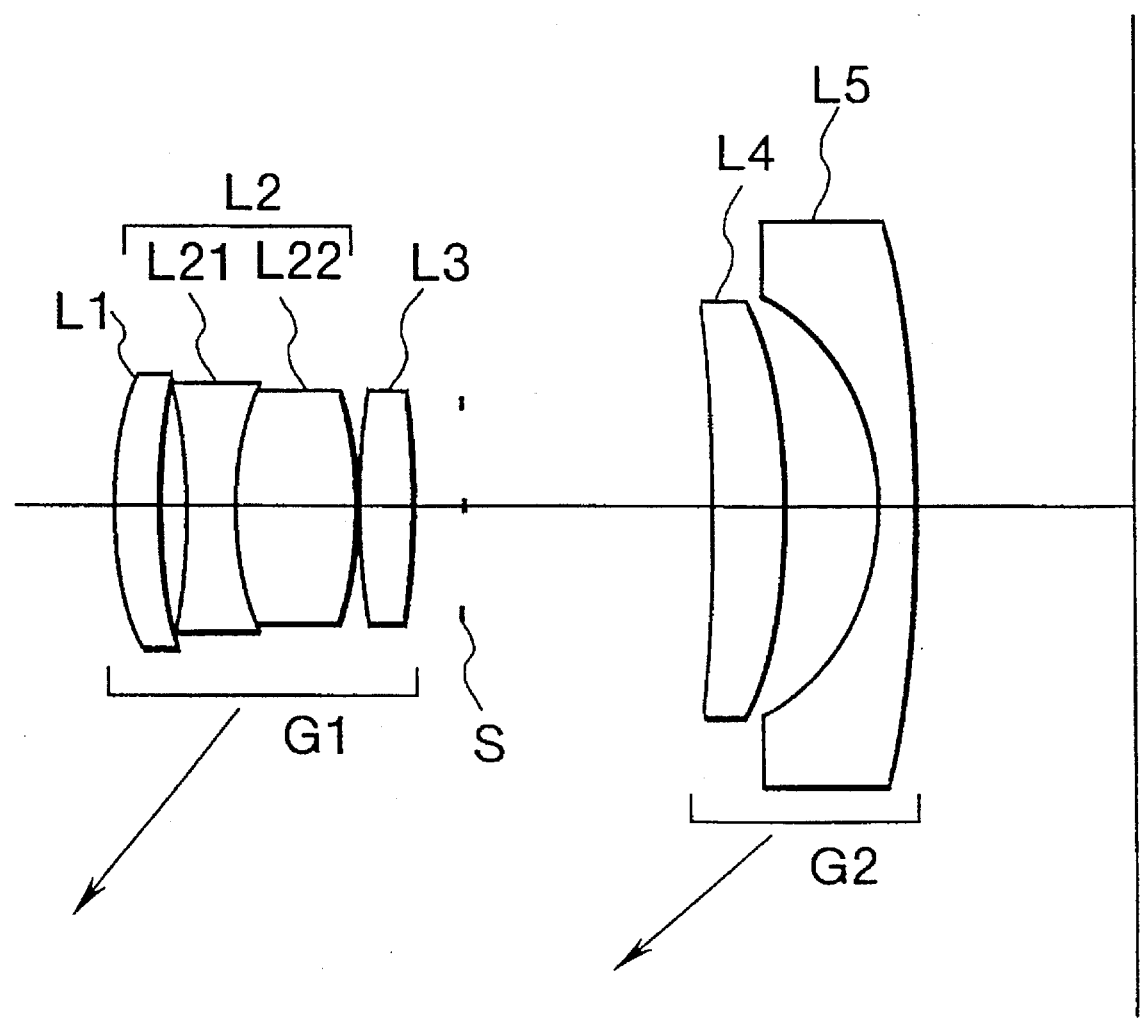
FIGURE

COMPACT ZOOM LENS

BACKGROUND OF THE INVENTION

1. Field of the Invention

This invention relates to a zoom lens, and particularly to a compact zoom lens suitable for use with a lens shutter camera.

2. Related Background Art

Zoom lenses are becoming mainstream in the field of photo-taking lenses for use with recent compact cameras of the lens shutter type. Particularly, various two-group zoom lenses comprising a simple construction have been proposed, and for example, Japanese Patent Application Laid-Open No. 2-73322 discloses a zoom lens of six-group six-lens construction, and Japanese Patent Application Laid-Open No. 4-225309 discloses a zoom lens of five-group six-lens construction. Also, Japanese Patent Application No. 3-319829 discloses an example in which an aspherical surface is introduced into a second lens group in order to achieve compactness and a high performance.

In the zoom lens disclosed in Japanese Patent Application Laid-Open No. 2-73322, a first lens group has comprised, in succession from the object side, a first positive lens component, a second negative lens component, a third positive lens component and a fourth positive lens component. However, since the second negative lens component and the third positive lens component are a biconcave lens and a biconvex lens, respectively, this zoom lens has suffered from the inconvenience that the deterioration of image when these lenses are decentered relative to each other is great.

In the zoom lens disclosed in Japanese Patent Application Laid-Open No. 4-225309, the second lens component and the third lens component are cemented together to thereby solve the above-mentioned problem. This zoom lens, however, has suffered from the inconvenience that the Abbe number of the second lens component is small and the correction of chromatic aberration is not sufficient.

Also, in achieving compactness, it is effective to make the refractive powers of the first lens group and second lens group great. However, the refractive power distribution with a stop interposed between the two lens groups becomes extremely asymmetrical and therefore, it becomes difficult to correct positive distortion at the wide-angle end and further, it is difficult to well correct the fluctuation of off-axis aberration caused by the angle of field, and this has led to the inconvenience that it is difficult to achieve compactness.

In order to solve this inconvenience in the zoom lens disclosed in Japanese Patent Application No. 3-319829, an aspherical surface has been introduced into the second lens group, but the position of the principal point of the first lens group lies -toward the image plane, and this is not very suitable for compactness and has led to the inconvenience that a zoom ratio of about 1.7 times is the limit.

The present invention has been made in view of the above-noted problems and the object thereof is to provide a compact zoom lens of high performance comprising a simple construction of a zoom ratio of about 2 times.

SUMMARY OF THE INVENTION

In order to solve the above-noted problems, the present invention provides a zoom lens (a variable focal length optical system) which is provided, in succession from the object side, with a first lens group G1 having positive refractive power, and a second lens group G2 having negative refractive power, said first lens group G1 having, in succession from the object side, a first lens component L1 having positive refractive power, a second lens component L2 comprising a cemented lens consisting of a negative lens component L21 and a positive lens component L22, and a third lens component L3 having positive refractive power, said second lens group G2 having, in succession from the object side, a fourth lens component L4 having positive refractive power, and a fifth lens component L5 having negative refractive power, and which satisfies the following condition:

$$-0.19 < (r23 - r32)/(r23 + r32) < -0.01,$$

where r23 is the radius of curvature of that surface of said second lens component L2 which is most adjacent to the image side, and r32 is the radius of curvature of that surface of said third lens component L3 which is most adjacent to the image side. The zoom lens preferably satisfies the following conditions:

$$0.06 < d45 \cdot (\phi 4 \cdot |\phi 5|)^{1/2} < 0.15$$

$$1.25 < |(n21-1)/r21|/\phi w < 1.7$$

where d45 is the on-axis air space between said fourth lens component L4 and said fifth lens component L5, $\phi 4$ is the refractive power of said fourth lens component L4, $\phi 5$ is the refractive power of said fifth lens component L5, $\phi w$ is the refractive power of the whole zoom lens system at the wide-angle end, r21 is the radius of curvature of that surface of said negative lens component L21 in said second lens component L2 which is adjacent to the object side, and n21 is the refractive index of said negative lens component L21 in said second lens component L2 for d-ray.

A preferred embodiment of the present invention satisfies the following conditions:

$$42.5 < \nu p1$$

$$2.0 < (|\phi G1| + |\phi G2|)/\phi w < 2.8$$

$$0.48 < \phi 1/\phi 3 < 0.68$$

where $\nu p1$ is the Abbe number of said negative lens component L21 in said second lens component L2, $\phi G1$ is the refractive power of said first lens group G1, $\phi G2$ is the refractive power of said second lens group G2, $\phi w$ is the refractive power of the whole zoom lens system at the wide-angle end, $\phi 1$ is the refractive power of said first lens component L1, and $\phi 3$ is the refractive power of said third lens component L3.

In a so-called convex-concave two-group zoom lens like the present invention, upon zooming from the wide-angle end to the telephoto end, the principal point spacing between the first lens group G1 having positive refractive power and the second lens group G2 having negative refractive power is decreased to thereby vary the focal length of the whole system. Also, a stop S is disposed between the first lens group G1 and the second lens group G2, and upon zooming from the wide-angle end to the telephoto end, the stop S is moved with the first lens group G1 or is independently moved.

However, the refractive power distribution is asymmetrical about the stop S and also, when a wider angle is contrived, the spacing between the first lens group G1 and the second lens group G2 becomes wider and therefore, positive distortion tends to increase at the wide-angle end. Accordingly, it is necessary to correct positive distortion independently in the first lens group G1 and the second lens group G2, but where the second lens group G2 is comprised of about two lenses as in the present invention, it is difficult to suppress the creation of positive distortion. Therefore, it is effective to make the first lens component L1 and second lens component L2 far from the stop in the first lens group G1 into appropriate shapes and create negative distortion.

So, it is preferable to make the first lens component L1 into a meniscus shape having its convex surface facing the object side, make that surface of the second lens component L2 which is most adjacent to the object side into a concave surface facing the object side, and make the length of the optical path from the stop S to that surface of the second lens component L2 which is most adjacent to the object side as great as possible to thereby create negative distortion.

On the other hand, in order to suppress positive distortion created in the second lens group G2 to the utmost, it is preferable to make the shapes of the fourth lens component L4 and the fifth lens component L5 into a meniscus shape having its concave surface facing the object side.

Also, in the present invention, upon zooming from the wide-angle end to the telephoto end, the principal point spacing between the first lens group G1 and the second lens group G2 becomes smaller and the second lens group G2 has negative refractive power and therefore, positive spherical aberration tends to increase at the telephoto end. Accordingly, the spacing between the fourth lens component L4 and the fifth lens component L5 is widened appropriately and negative spherical aberration created in the fourth lens component L4 and positive spherical aberration created in the fifth lens component L5 are offset, whereby the fluctuation of spherical aberration during zooming from the wide-angle end to the telephoto end can be suppressed.

Further, with the zooming from the wide-angle end to the telephoto end, the height of off-axis ray passing through the second lens group G2 approximates to the optical axis and therefore, if that surface of the fourth lens component L4 which is adjacent to the object side is made aspherical, the fluctuation of coma during the zooming from the wide-angle end to the telephoto end could be suppressed well.

Also, since the first lens group G1 has positive refractive power, it is desirable that negative spherical aberration created in the first lens group G1 be corrected well. Accordingly, it is preferable to create positive spherical aberration moderately in surfaces having negative refractive power, particularly that surface of the second lens component L2 which is most adjacent to the object side and the cemented surface thereof.

By constructing the second lens component L2 of a cemented lens consisting of a negative lens component L21 which is a biconcave lens and a positive lens component L22 which is a biconvex lens, spherical aberration and chromatic aberration can be corrected well, and by making that surface of the second lens component L2 which is most adjacent to the image side into a convex surface relative to the image side, coma for lower ray can be corrected well.

In addition, by the fourth lens component L4 and the fifth lens component L5 having their concave surfaces turned to the stop S, it is made possible to correct astigmatism and coma well.

Each conditional expression will hereinafter be described. Description will first be made of the following three conditional expressions:

$$-0.19 < (r23-r32)/(r23+r32) < -0.01 \quad (1)$$

$$0.06 < d45 \cdot (\phi 4. |\phi 5|)^{1/2} < 0.15 \quad (2)$$

$$1.25 < |(n21-1)/r21|/\phi w < 1.7 \quad (3)$$

where r23: the radius of curvature of that surface of the second lens component L2 which is most adjacent to the image side;

r32: the radius of curvature of that surface of the third lens component L3 which is most adjacent to the image side;

d45: the on-axis air space between the fourth lens component L4 and the fifth lens component L5;

φ4: the refractive power of the fourth lens component L4;

φ5: the refractive power of the fifth lens component L5;

φw: the refractive power of the whole zoom lens system at the wide-angle end;

r21: the radius of curvature of that surface of the negative lens component L21 in the second lens component which is adjacent to the object side;

n21: the refractive index of the negative lens component L21 in the second lens component for d-ray.

Conditional expression (1) prescribes the relation between the radius of curvature of that surface of the second lens component L2 which is most adjacent to the image side and the radius of curvature of that surface of the third lens component L3 which is most adjacent to the image side and is concerned in the balance in correction between negative spherical aberration and off-axis aberration.

Since as compared with the third lens component L3, the second lens component L2 is disposed at a location far from the stop S, the height at which the off-axis ray passes through that surface of the second lens component L2 which is most adjacent to the image side is farther from the optical axis than the height at which the off-axis ray passes through that surface of the third lens component L3 which is most adjacent to the image side. Accordingly, the correction of coma for lower ray becomes deficient as r32 becomes small relative to r23. That is, if the upper limit value of conditional expression (1) is exceeded, the correction of coma for lower ray will become insufficient and it will become difficult to obtain a good imaging performance.

Conversely, as r23 becomes small relative to r32, the distribution of positive refractive power inclines toward that surface of the second lens component L2 which is most adjacent to the image side and negative spherical aberration created in this surface increases suddenly. That is, if the lower limit value of conditional expression (1) is exceeded, the correction of spherical aberration in the first lens group G1 will be deficient, and this is not preferable.

To obtain a better imaging performance, it is desirable that the lower limit value of conditional expression (1) be of the order of −0.16.

Conditional expression (2) is a condition for attaining balance between compactness and a good imaging performance. In this conditional expression, $\phi 45 = (\phi 4. |\phi 5|)^{1/2}$ is concerned with the mean of the magnitude φ4 of the refractive power of the fourth lens component L4 and the magnitude |φ5| of the refractive power of the fifth lens component L5.

The following two cases are conceivable as cases where the upper limit value of conditional expression (2) is exceeded:

(a) a case where the on-axis air space between the fourth lens component L4 and the fifth lens component L5 becomes great; and (b) a case where the refractive power of the fourth lens component L4 and the refractive power of the fifth lens component L5 become great.

In case (a), as previously described, the fluctuation of spherical aberration by zooming can be suppressed well, but at the wide-angle end, the off-axis ray passing through the fifth lens component L5 becomes far from the optical axis and therefore, the effective diameter of the lens positioned most adjacent to the image plane becomes large, and this is not preferable in achieving compactness.

In case (b), at the wide-angle end, the height of the off-axis ray passing through the fourth lens component L4 and the fifth lens component L5 approximates to the optical axis and this leads to compactness, but it becomes difficult to well suppress the fluctuation of coma during a change of the angle of field, and this is inconvenient.

The following two cases are conceivable as cases where conversely, the lower limit value of conditional expression (2) is exceeded:

(c) a case where the on-axis air space between the fourth lens component L4 and the fifth lens component L5 becomes small; and (d) a case where the refractive power of the fourth lens component L4 and the refractive power of the fifth lens component L5 become small.

In case (c), the off-axis ray passing through the fifth lens component L5 approximates to the optical axis and this leads to a reduction in the effective diameter of the lens positioned most adjacent to the image plane, but it becomes difficult to well suppress the fluctuation of spherical aberration by zooming, and this is not preferable.

In case (d), at the wide-angle end, the height of the off-axis ray passing through the fourth lens component L4 and the fifth lens component L5 becomes far from the optical axis and therefore, it becomes difficult to attain compactness, and this is inconvenient.

Conditional expression (3) prescribes an appropriate range of the refractive power of that surface of the second lens component L2 which is most adjacent to the object side.

If the upper limit value of conditional expression (3) is exceeded and the refractive power becomes great to the negative, the height of the off-axis ray passing through that surface of the second lens component L2 which is most adjacent to the object side will approximate to the optical axis. Therefore, it will become difficult to correct on-axis aberration and off-axis aberration in the first lens group G1 independently of each other, and this is inconvenient.

If conversely, the lower limit value of conditional expression (3) is exceeded and the refractive power becomes small to the negative, the correction of negative spherical aberration in the first lens group G1 will be deficient and the principal point position of the first lens group G1 will approach the object side and therefore, positive distortion will increase at the wide-angle end. That is, if the lower limit value of conditional expression (3) is exceeded, it will become difficult to correct negative spherical aberration and positive distortion, and this is not preferable.

In the present invention, it is desirable that in addition to the above-described conditions, the following conditional expressions (4) to (6) be satisfied:

$$42.5 < \nu p1 \quad (4)$$

$$2.0 < (|\phi G1| + |\phi G2|)/\phi w < 2.8 \quad (5)$$

$$0.48 < \phi 1/\phi 3 < 0.68 \quad (6)$$

where

νp1: the Abbe number of the negative lens component L21 in the second lens component;

φG1: the refractive power of the first lens group G1;

φG2: the refractive power of the second lens group G2;

φw: the refractive power of the whole zoom lens system at the wide-angle end;

φ1: the refractive power of the first lens component L1;

φ3: the refractive power of the third lens component L3.

Conditional expression (4) prescribes an appropriate range of the Abbe number of the negative lens component L21 included in the second lens component L2.

If the lower limit value of conditional expression (4) is exceeded, the amount of coma created for the off-axis ray passing a height far from the optical axis of the negative lens component L21 will differ greatly depending on wavelength, and this is not preferable.

Conditional expression (5) prescribes the sum of the magnitude of the refractive power of the first lens group G1 and the magnitude of the refractive power of the second lens group G2.

If the upper limit value of conditional expression (5) is exceeded, it will lead to the compactness of the lens system and particularly, at the wide-angle end, the height of the off-axis ray passing through the second lens group G2 will approximate to the optical axis, and this is effective to reduce the effective diameter of the lens positioned most adjacent to the image plane. However, the difference between the height at which the on-axis ray passes through the second lens group G2 and the height at which the off-axis ray passes through the second lens group G2 will become small and therefore, it will become difficult to correct on-axis aberration and off-axis aberration independently of each other. Further, the refractive power distribution will become extremely asymmetrical and therefore it will become difficult to correct positive distortion, and this is inconvenient.

If conversely, the lower limit value of conditional expression (5) is exceeded, the difference between the height at which the on-axis ray passes through the second lens group G2 and the height at which the off-axis ray passes through the second lens group G2 will become great and therefore it will become possible to correct on-axis aberration and off-axis aberration independently of each other, but the lens system will become bulky, and this is not preferable.

Conditional expression (6) prescribes an appropriate range of the ratio of the refractive power of the first lens component L1 to the refractive power of the third lens component L3.

If the upper limit value of conditional expression (6) is exceeded and the refractive power of the first lens component L1 becomes great to the positive, the principal point position of the first lens group G1 will approach the object side, and this is advantageous for the shortening of the full length of the zoom lens. However, positive distortion will increase and further, the off-axis ray passing through the first lens component L1 will become far from the optical axis and therefore, the effective diameter of the fore lens will become larger, and this is inconvenient.

If conversely, the lower limit value of conditional expression (6) is exceeded, the principal point position of the first lens group G1 will approach the image side and therefore the full length of the zoom lens will become great, and this is not preferable.

Further, to obtain a higher imaging performance, it is desirable to introduce an aspherical surface into the second lens group G2, and it is particularly desirable to make that surface of the second lens group which is most adjacent to the object side aspherical. Since the difference between the heights of the on-axis ray and off-axis ray passing through the second lens group G2 is great, it is possible to attain a wider angle and compactness and yet obtain a higher imaging performance by introducing an aspherical surface into the second lens group G2.

BRIEF DESCRIPTION OF THE DRAWING

The FIGURE of the accompanying drawing shows the basic construction of a zoom lens according to each embodiment of the present invention and the state of movement of each lens group during zooming from the wide-angle end to the telephoto end.

DESCRIPTION OF THE PREFERRED EMBODIMENTS

The FIGURE of the drawing shows the basic construction of a zoom lens according to each embodiment of the present invention. The FIGURE shows the positional relation between lens groups at the wide-angle end, and during zooming to the telephoto end, the lens groups are moved on the optical axis along orbits indicated by arrows.

As shown in the FIGURE, in each embodiment of the zoom lens according to the present invention, a first lens group G1 comprises, in succession from the object side, a first lens component L1 comprising a positive meniscus lens having its convex surface facing the object side, a second lens component L2 comprising a cemented lens consisting of a biconcave lens L21 and a biconvex lens L22 and a third lens component L3 comprising a biconvex lens. On the other hand, a second lens group G2 comprises, in succession from the object side, a fourth lens component L4 comprising a positive meniscus lens having its concave surface facing the object side, and a fifth lens component L5 comprising a negative meniscus lens having its concave surface facing the object side.

An aperture stop S is disposed between the first lens group G1 and the second lens group G2 and near the first lens group G1. During zooming from the wideangle end to the telephoto end, the first lens group G1 and the second lens group G2 are both moved toward the object side in such a manner that the air space between the first lens group G1 and the second lens group G2 increases. During zooming from the wide-angle end to the telephoto end, the aperture stop S is moved with the first lens group G1.

Each embodiment of the present invention will hereinafter be described with reference to the accompanying drawing.

[Embodiment 1]

The values of the various elements of Embodiment 1 of the present invention are given in Table 1 below. In Table 1, f represents the focal length, FNO represents F-number, and 2ω represents the angle of field. Further, refractive indices and Abbe numbers indicate values for d-ray (λ=587.6 nm).

When the height in a direction perpendicular to the optical axis is y and the amount of displacement (the amount of sag) in the direction of the optical axis at the height y is S(y) and the reference radius of curvature is R and the cone coefficient is k and the aspherical surface coefficient of the nth order is $C_n$, the aspherical surface is expressed by the following mathematical expression (e):

$$S(y) = (y^2/R)/[1 + (1 - k \cdot y^2/R^2)^{1/2}] + C_2 \cdot y^2 + C_4 \cdot y^4 + C_6 \cdot y^6 + C_8 \cdot y^8 + C_{10} \cdot y^{10} + \ldots \quad (e)$$

Also, the paraxial radius of curvature γ of the aspherical surface is defined by the following mathematical expression (f):

$$\gamma = 1/(2 \cdot C_2 + 1/R) \quad (f)$$

The aspherical surface in the table of the various elements of each embodiment has a mark * attached to its lens surface number.

TABLE 1 f = 36.2 – 50.2 – 68.4 mm
FNO = 4.1 – 5.6 – 7.7
2ω = 60.6 – 46.2 – 35.0

| Lens Surface No. (from object side) | Radius of Curvature | Lens Surface Spacing | Refractive Index | Abbe Number |
|---|---|---|---|---|
| 1 | 15.4090 | 2.01 | 1.74443 | 49.5 |
| 2 | 28.4086 | 1.26 | | |
| 3 | –17.5010 | 2.01 | 1.74400 | 45.0 |
| 4 | 12.7641 | 5.27 | 1.48749 | 70.4 |
| 5 | –17.6935 | 0.13 | | |
| 6 | 32.7137 | 2.64 | 1.51835 | 60.2 |
| 7 | –19.9866 | 2.00 | | |
| 8 | ∞ | (d8 = variable) | (stop) | |
| 9* | –42.6036 | 3.14 | 1.81474 | 37.0 |
| 10 | –22.5990 | 3.89 | | |
| 11 | –11.0016 | 1.51 | 1.77279 | 49.5 |
| 12 | –70.6084 | (Bf) | | |

(Variable Spacing in Zooming)

| f | 36.1672 | 50.2322 | 68.4409 |
|---|---|---|---|
| d8 | 11.2227 | 5.9937 | 2.4164 |
| Bf | 10.0370 | 24.0889 | 42.2806 |

(Aspherical Surface Data)

| | k | $C_2$ | $C_4$ |
|---|---|---|---|
| 9th surface | –2.675 | 0.0000 | $0.2483 \times 10^{-4}$ |
| | $C_6$ | $C_8$ | $C_{10}$ |
| | $0.4534 \times 10^{-6}$ | $-0.4302 \times 10^{-8}$ | $0.4078 \times 10^{-10}$ |

(Condition-Corresponding Values)
(1) (r23 – r32)/(r23 + r32) = –0.061
(2) d45.(φ4.|φ5|)$^{1/2}$ = 0.127
(3) |φ21|/φw = 1.537
(4) υp1 = 45.0
(5) (φG1 + |φG2|)/φw = 2.783
(6) φ1/φ3 = 0.573

[Embodiment 2]

The zoom lens of Embodiment 2 is similar in construction to the above-described zoom lens of Embodiment 1, but differs in the refractive index and shape of each lens group from the zoom lens of Embodiment 1.

The values of the various elements of Embodiment 2 of the present invention are given in Table 2 below. In Table 2, f represents the focal length, FNO represents F-number, and 2ω represents the angle of field. Further, the refractive indices and Abbe numbers indicate values for d-ray (λ=587.6 nm).

TABLE 2 f = 36.2 – 50.2 – 68.4 mm
FNO = 3.8 – 5.3 – 7.2
2ω = 60.6 – 46.2 – 35.0

| Lens Surface No. (from object side) | Radius of Curvature | Lens Surface Spacing | Refractive Index | Abbe Number |
|---|---|---|---|---|
| 1 | 15.3280 | 2.01 | 1.72000 | 50.2 |
| 2 | 28.2758 | 1.26 | | |
| 3 | –17.3823 | 2.26 | 1.74400 | 45.0 |
| 4 | 12.4571 | 5.02 | 1.51860 | 70.0 |
| 5 | –18.6973 | 0.13 | | |
| 6 | 36.3213 | 2.64 | 1.53996 | 59.6 |

TABLE 2-continued $f = 36.2 - 50.2 - 68.4$ mm
$FNO = 3.8 - 5.3 - 7.2$
$2\omega = 60.6 - 46.2 - 35.0$

| | | | | |
|---|---|---|---|---|
| 7 | −20.1965 | 1.76 | | |
| 8 | ∞ | (d8 = variable) | (stop) | |
| 9* | −41.3167 | 3.14 | 1.81474 | 37.0 |
| 10 | −22.5665 | 3.89 | | |
| 11 | −10.9468 | 1.51 | 1.77279 | 49.5 |
| 12 | −64.5325 | (Bf) | | |

(Variable Spacing in Zooming)

| f | 36.1674 | 50.2326 | 68.4419 |
|---|---|---|---|
| D8 | 11.4632 | 6.2317 | 2.6525 |
| Bf | 9.9511 | 24.0162 | 42.2255 |

(Aspherical Surface Data)

| | k | $C_2$ | $C_4$ |
|---|---|---|---|
| 9th surface | −2.675 | 0.0000 | $0.2550 \times 10^{-4}$ |
| | $C_6$ | $C_8$ | $C_{10}$ |
| | $0.4563 \times 10^{-6}$ | $-0.4071 \times 10^{-8}$ | $0.4017 \times 10^{-10}$ |

(Condition-Corresponding Values)
(1) $(r23 - r32)/(r23 + r32) = -0.039$
(2) $d45 \cdot (\phi4 \cdot |\phi5|)^{1/2} = 0.124$
(3) $|\phi21|/\phi w = 1.548$
(4) $\upsilon p1 = 45.0$
(5) $(\phi G1 + |\phi G2|)/\phi w = 2.783$
(6) $\phi1/\phi3 = 0.560$

[Embodiment 3]

The zoom lens of Embodiment 3 is similar in construction to the above-described zoom lens of Embodiment 1, but differs in the refractive power and shape of each lens group from the zoom lens of Embodiment 1.

The values of the various elements of Embodiment 3 of the present invention are given in Table 3 below. In Table 3, f represents the focal length, FNO represents F-number, and 2ω represents the angle of field. Further, the refractive indices and Abbe numbers indicate values for d-ray (λ=587.6 nm).

TABLE 3

$f = 36.2 - 50.2 - 68.4$ mm
$FNO = 3.7 - 5.1 - 7.0$
$2\omega = 60.8 - 46.4 - 35.0$

| Lens Surface No. (from object side) | Radius of Curvature | Lens Surface Spacing | Refractive Index | Abbe Number |
|---|---|---|---|---|
| 1 | 16.8343 | 2.01 | 1.72000 | 50.2 |
| 2 | 35.7591 | 1.26 | | |
| 3 | −18.5943 | 2.51 | 1.79668 | 45.4 |
| 4 | 15.9902 | 5.27 | 1.51860 | 70.0 |
| 5 | −18.4406 | 0.13 | | |
| 6 | 53.3043 | 2.64 | 1.61272 | 58.5 |
| 7 | −24.0702 | 2.00 | | |
| 8 | ∞ | (d8 = variable) | (stop) | |
| 9* | −26.5375 | 2.51 | 1.73077 | 40.5 |
| 10 | −20.4058 | 5.40 | | |
| 11 | −11.9331 | 1.51 | 1.67025 | 57.5 |
| 12 | −61.9007 | (Bf) | | |

(Variable Spacing in Zooming)

| f | 36.0000 | 50.0000 | 68.1250 |
|---|---|---|---|
| d8 | 13.3801 | 7.1741 | 2.9279 |
| Bf | 7.9239 | 22.5624 | 41.5168 |

TABLE 3-continued $f = 36.2 - 50.2 - 68.4$ mm
$FNO = 3.7 - 5.1 - 7.0$
$2\omega = 60.8 - 46.4 - 35.0$ (Aspherical Surface Data)

| | k | $C_2$ | $C_4$ |
|---|---|---|---|
| 9th surface | −2.675 | 0.0000 | $0.1653 \times 10^{-5}$ |
| | $C_6$ | $C_8$ | $C_{10}$ |
| | $0.7834 \times 10^{-7}$ | $0.1939 \times 10^{-8}$ | $-0.5082 \times 10^{-11}$ |

(Condition-Corresponding Values)
(1) $(r23 - r32)/(r23 + r32) = -0.132$
(2) $d45 \cdot (\phi4 \cdot |\phi5|)^{1/2} = 0.113$
(3) $|\phi21|/\phi w = 1.549$
(4) $\upsilon p1 = 45.4$
(5) $(\phi G1 + |\phi G2|)/\phi w = 2.555$
(6) $\phi1/\phi3 = 0.648$

[Embodiment 4]

The zoom lens of Embodiment 4 is similar in construction to the above-described zoom lens of Embodiment 1, but differs in the refractive power and shape of each lens group from the zoom lens of Embodiment 1.

The values of the various elements of Embodiment 4 of the present invention are given in Table 4 below. In Table 4, f represents the focal length, FNO represents F-number, and 2ω represents the angle of field. Further, the refractive indices and Abbe numbers indicate values for d-ray (λ=587.6 nm).

TABLE 4

$f = 36.2 - 50.2 - 68.4$ mm
$FNO = 3.8 - 5.3 - 7.2$
$2\omega = 60.6 - 46.2 - 35.0$

| Lens Surface No. (from object side) | Radius of Curvature | Lens Surface Spacing | Refractive Index | Abbe Number |
|---|---|---|---|---|
| 1 | 17.0064 | 2.01 | 1.72000 | 50.2 |
| 2 | 38.2403 | 1.26 | | |
| 3 | −18.0504 | 2.51 | 1.79668 | 45.4 |
| 4 | 15.4694 | 5.02 | 1.51860 | 70.0 |
| 5 | −18.4163 | 0.13 | | |
| 6 | 45.9519 | 2.39 | 1.58913 | 61.1 |
| 7 | −22.3814 | 1.80 | | |
| 8 | ∞ | (d8 = variable) | (stop) | |
| 9* | −29.23758 | 3.14 | 1.73077 | 40.5 |
| 10 | −20.1298 | 4.40 | | |
| 11 | −11.0843 | 1.51 | 1.69680 | 55.6 |
| 12 | −55.7871 | (Bf) | | |

(Variable Spacing in Zooming)

| f | 36.1676 | 50.2332 | 68.4432 |
|---|---|---|---|
| d8 | 12.7994 | 7.0596 | 3.1328 |
| Bf | 8.8125 | 23.3358 | 41.1383 |

(Aspherical Surface Data)

| | k | $C_2$ | $C_4$ |
|---|---|---|---|
| 9th surface | −2.675 | 0.0000 | $0.1764 \times 10^{-4}$ |
| | $C_6$ | $C_8$ | $C_{10}$ |
| | $0.1447 \times 10^{-6}$ | $0.1736 \times 10^{-8}$ | $-0.4735 \times 10^{-11}$ |

(Condition-Corresponding Values)
(1) $(r23 - r32)/(r23 + r32) = -0.097$
(2) $d45 \cdot (\phi4 \cdot |\phi5|)^{1/2} = 0.099$
(3) $|\phi21|/\phi w = 1.596$
(4) $\upsilon p1 = 45.4$
(5) $(\phi G1 + |\phi G2|)/\phi w = 2.651$
(6) $\phi1/\phi3 = 0.633$ Each of the above-described embodiments has been shown as an example in which during zooming from the wide-angle end to the telephoto end, the aperture stop S is moved with the first lens group G1, but it is apparent that the aperture stop S may be moved independently of the first lens group G1.

Also, by introducing an aspherical surface into the first lens group G1, it is possible to well correct negative spherical aberration created in the first lens group G1 and make the lens system brighter.

Further, it is possible to suitably move the whole or a part of any one lens group in a direction substantially orthogonal to the optical axis to thereby obtain the so-called vibration preventing effect of correcting, for example, the fluctuation of image position attributable to hand vibration or the like.

As described above, according to the present invention, there can be achieved a compact and high-performance zoom lens of a simple construction in which the zoom ratio is of the order of two times.

What is claimed is:

1. A variable focal length optical system comprising from the object side:

a first lens group having positive refractive power, said first lens group including, in succession from the object side, a first lens component having positive refractive power, a second lens component comprising a cemented lens consisting of a negative lens component and a positive lens component, and a third lens component having positive refractive power; and a second lens group having negative refractive power, said second lens group including, in succession from the object side, a fourth lens component having positive refractive power, and a fifth lens component having negative refractive power;

said optical system satisfying the following condition:

$$-0.19 < (r23-r32)/(r23+r32) < -0.01,$$

where $r23$: the radius of curvature of that surface of said second lens component which is most adjacent to the image side;

$r32$: the radius of curvature of that surface of said third lens component which is most adjacent to the image side.

2. A variable focal length optical system according to claim 1, satisfying the following conditions:

$$0.06 < d45 \cdot (\phi 4 \cdot |\phi 5|)^{1/2} < 0.15$$

$$1.25 < |(n21-1)/r21|/\phi w < 1.7$$

where $d45$: the on-axis air space between said fourth lens component and said fifth lens component;

$\phi 4$: the refractive power of said fourth lens component;

$\phi 5$: the refractive power of said fifth lens component;

$\phi w$: the refractive power of the whole variable focal length optical system at the wide-angle end;

$r21$: the radius of curvature of that surface of said negative lens component in said second lens component which is adjacent to the object side;

$n21$: the refractive index of said negative lens component in said second lens component for d-ray.

3. A variable focal length optical system according to claim 1, satisfying the following conditions:

$$42.5 < \nu p1$$

$$2.0 < (\phi G1 + |\phi G2|)/\phi w < 2.8$$

$$0.48 < \phi 1/\phi 3 < 0.68$$

where $\nu p1$: the Abbe number of said negative lens component in said second lens component;

$\phi G1$: the refractive power of said first lens group;

$\phi G2$: the refractive power of said second lens group;

$\phi w$: the refractive power of the whole variable focal length optical system at the wide-angle end;

$\phi 1$: the refractive power of said first lens component;

$\phi 3$: the refractive power of said third lens component.

4. A variable focal length optical system according to claim 1, wherein that surface of said second lens group which is most adjacent to the object side is an aspherical surface.

5. A variable focal length optical system according to claim 1, wherein said first lens component is a positive meniscus lens having its convex surface facing the object side, and that surface of said second lens component which is most adjacent to the object side is of a shape having a concave surface facing the object side.

6. A variable focal length optical system according to claim 1, wherein said fourth lens component and said fifth lens component each are a meniscus lens having its concave surface facing the object side.

7. A variable focal length optical system according to claim 1, wherein said second lens component is a cemented lens consisting of a negative lens component comprising a biconcave lens and a positive lens component comprising a biconvex lens, and that surface of said second lens component which is most adjacent to the image side is a convex surface facing the image side.

* * * * *